United States Patent
Bonne et al.

(10) Patent No.: US 10,478,764 B2
(45) Date of Patent: Nov. 19, 2019

(54) DEVICE AND ARRANGEMENT HAVING A FILTERING ELEMENT FOR SEPARATING OIL FROM THE CRANKCASE EMISSIONS OF AN INTERNAL COMBUSTION ENGINE

(71) Applicant: SOGEFI FILTRATION, Guyancourt (FR)

(72) Inventors: Samuel Bonne, La Graverie (FR); Christophe Petipas, Le Chesnay (FR); Jean-Jacques Falchon, Velizy (FR)

(73) Assignee: Sogefi Filtration, Guyancourt (FR)

( * ) Notice: Subject to any disclaimer, the term of this patent is extended or adjusted under 35 U.S.C. 154(b) by 199 days.

(21) Appl. No.: 15/568,640

(22) PCT Filed: Apr. 11, 2016

(86) PCT No.: PCT/FR2016/050826
§ 371 (c)(1),
(2) Date: Oct. 23, 2017

(87) PCT Pub. No.: WO2016/170248
PCT Pub. Date: Oct. 27, 2016

(65) Prior Publication Data
US 2018/0104633 A1    Apr. 19, 2018

(30) Foreign Application Priority Data
Apr. 24, 2015  (FR) .................................... 15 53707

(51) Int. Cl.
*B01D 46/00*      (2006.01)
*F01M 13/04*     (2006.01)
(Continued)

(52) U.S. Cl.
CPC ..... *B01D 46/0056* (2013.01); *B01D 46/0001* (2013.01); *B01D 46/003* (2013.01);
(Continued)

(58) Field of Classification Search
CPC .............. B01D 45/00–16; B01D 46/00; B01D 46/0027–0038; B01D 46/0056;
(Continued)

(56) References Cited

U.S. PATENT DOCUMENTS 5,716,423 A * 2/1998 Krul ....................... B01D 45/14
55/485

FOREIGN PATENT DOCUMENTS

| EP | 2 383 029 A1 | 11/2011 |
| FR | 2 933 626 A1 | 1/2010 |
| WO | 2013/067245 A1 | 5/2013 |

OTHER PUBLICATIONS

International Search Report, dated Jul. 7, 2017, from corresponding PCT/FR2016/050826 application.

* cited by examiner

Primary Examiner — T. Bennett McKenzie
(74) Attorney, Agent, or Firm — Young & Thompson (57) ABSTRACT

Disclosed is an arrangement of a filtering element for a device for purifying gas from the crankcase of an internal combustion engine, which includes: a filtering element mounted so as to rotate about an axis and having an annular filtering medium; a rotor element capable of being part of a rotating system, making it possible to turn the filtering element by way of notches formed on the outer surface of a sleeve. The flanges of the filtering element are attached to one another in an inner space defined by the medium, typically by snap-fitting, using at least one retaining member and an anchor portion engaging with one another with an anti-rotation effect. The anchoring portion is provided with inner projections forming contact surfaces, preferably angular, which are inserted into the notches of the sleeve when the rotor element is inserted into the inner space.

20 Claims, 5 Drawing Sheets

(51) Int. Cl.
*F01M 13/00* (2006.01)
*F01M 11/08* (2006.01)
*B01D 45/12* (2006.01)

(52) U.S. Cl.
CPC .............. *F01M 13/04* (2013.01); *B01D 45/12* (2013.01); *B01D 2265/021* (2013.01); *B01D 2265/028* (2013.01); *B01D 2265/06* (2013.01); *F01M 11/08* (2013.01); *F01M 13/00* (2013.01); *F01M 2013/0422* (2013.01)

(58) Field of Classification Search
CPC .............. B01D 46/0001; B01D 46/003; B01D 2265/021; B01D 2265/028; B01D 2265/06; F01M 2013/0422; F01M 13/00–06
USPC ............................... 55/400–409; 96/155–220
See application file for complete search history.

DEVICE AND ARRANGEMENT HAVING A FILTERING ELEMENT FOR SEPARATING OIL FROM THE CRANKCASE EMISSIONS OF AN INTERNAL COMBUSTION ENGINE

FIELD OF THE INVENTION

The present invention relates to devices for separating particles in suspension in a gas issuing from a crankcase of an internal combustion engine. The scope of the invention concerns in particular the separation of oil from crankcase emissions in combustion engines for road vehicles (for example cars, trucks, motorcycles) or boats and in industrial combustion engines (engine-generators for example).

BACKGROUND OF THE INVENTION

In a known manner, the crankcase is connected to the air intake of the internal combustion engine via a separation device in order to continuously evacuate crankcase emissions and extract the suspended oil. This is known to the skilled person as the crankcase emission or blowby gas recycling system. Various means for separating oil from crankcase emissions are used in the prior art, among which are cyclones, baffles, centrifugal separators, static coalescers, and dynamic coalescers.

In the category of dynamic coalescers, the media used is typically the same as in static coalescers, but the filtering element comprising this medium is also rotated. These devices combine the advantages of the static coalescer and centrifugal separators: the efficiency is high due to the filtering medium and the pressure drop is reduced due to the centrifugal effect which contributes to evacuating the oil from the medium. This rotation makes it possible to use a more closed and therefore more efficient medium while maintaining an acceptable pressure drop. One should refer in particular to document FR 2 933 626, which describes such a device. The rotor element engaged in the inner space of the filtering element typically cooperates with one of the two flanges of the filtering element. However, the other flange may then be more likely to break due to the torsional forces (these forces tending to tear this flange from the filtering medium).

Another disadvantage of this type of separation device is that its construction is more complex, due to the mobility of the parts and the need for fluidtightness between the area upstream of the filtering element where the crankcase emissions circulate and the area downstream where the purified emissions circulate. Assembly on the drive shaft can also be difficult. This results in an additional cost, which limits the use of dynamic coalescers.

OBJECTS OF THE INVENTION

The object of the present invention is to overcome one or more of the aforementioned disadvantages by proposing a filtering element arrangement for a device for removing the oil from engine crankcase emissions, which is simpler in design.

To this end, the invention relates to a filtering element arrangement for a device for purifying emissions issuing from a crankcase of an internal combustion engine, comprising:
a filtering element mounted so as to rotate about an axis and having an annular filtering medium, and
a rotor element capable of being part of a rotational drive system, making it possible to turn the filtering element by means of notches formed on the external face of a sleeve,
wherein the flanges of the filtering element are fixed to one another in an inner space defined by the filtering medium (typically by snap-fitting), using at least one retaining member and an anchoring part engaging with one another in an anti-rotation effect, the anchoring part being provided with inner engagement means or projections forming contact surfaces (preferentially angular), which engage with the notches of the sleeve when the rotor element is inserted into the inner space.

The annular filtering medium, in particular of the type provided with a coalescer medium, extends longitudinally around a central axis between a first axial face and a second axial face, the filtering medium having an internal face defining the inner space.

The rotor element, intended for rotating the filtering element, is engaged in the inner space against a plurality of contact surfaces of the filtering element in an assembled state between the rotor element and the filtering element. The sleeve, a single piece which is part of the rotor element, extends longitudinally around the central axis and the N notches formed on the external face may each be defined between two longitudinal edges (N being an integer greater than or equal to two). The sleeve is suitable for insertion into the inner space (typically through an axial opening of the filtering element).

In practice, the filtering element comprises a first flange covering the first axial face and preferably provided with a first central opening (enabling insertion of the sleeve into the inner space), this first flange comprising the anchoring part which extends longitudinally in the inner space around the sleeve, toward the second flange of the filtering element. Spaced-apart first contact surfaces (among the plurality of contact surfaces) are defined by the anchoring part which provides N engagement means projecting radially inwardly for engaging the N notches in a fitted manner (thus able to cooperate with each of said two longitudinal edges and preventing any relative rotation between the two flanges). The retaining member or members, which are part of the second flange, engage with the anchoring part in order to render the first and second flanges rotationally integral.

With such an arrangement, it is possible to index the two flanges with respect to one another while preventing rotation on the drive sleeve. The engagement means, which form projections from the anchoring part, play a role entirely comparable to that of cotters. But unlike cotters, each projection can be formed integrally with the first flange, which reduces the risk of breakage.

According to one particular feature, the second flange comprises two spaced-apart retaining members engaged with the anchoring part and rendering the first and second flanges rotationally integral. Each of these two retaining members engages by abutment with the anchoring part, forming an axial stop that opposes separation of the two flanges in opposite directions.

The fact that two retaining members are used makes the connection between the flanges particularly robust (which also enables, where appropriate, reducing the thickness in the deformable parts of these retaining members). It is understood that the filtering element arrangement is particularly simple and that three functions are combined at the connection elements defined by the anchoring part of the first flange: indexing with the second flange (no relative rotation possible), maintaining the height of the filtering element (no axial gap possible), and mechanical connection with the rotor element.

In the foregoing and in the following, it is understood that the term "flange" is to be broadly interpreted and is not to be reduced to only the radial portion covering the filtering medium. On the contrary, it is not excluded that the flange has axial extensions (in particular the anchoring part) and/or radial extensions, possibly with an assembly of multiple parts.

According to one particular feature, the sleeve comprises a pipe portion designed to circulate a flow of gas in the inner space towards or away from the internal face of the filtering medium, the pipe portion projecting axially outward from the first flange. This enables channeling the gases without adding a specific part, it being possible to surround the end of the pipe portion by a dynamic seal. Particularly when the direction of flow of the gases is centripetal, an outlet for purified gases may be provided in a cover of the purification device which integrates the dynamic seal. The filtering element arrangement with such a pipe portion in a rotor element provides a good compromise between pressure loss and separation efficiency.

According to another feature, the two retaining members extend distanced from the pipe portion and define second contact surfaces among the plurality of contact surfaces. In this case, the filtering element is then also mechanically connected to the rotor element via the second flange. In particular, it is advantageous to define an annular region of sealing contact between the sleeve and the second flange, thereby eliminating the need for an additional separate seal.

In various embodiments of the device for purifying crankcase emissions according to the invention, one or more of the following arrangements may possibly be used:

the two retaining members are in contact with the anchoring part in two respective overlapping areas, the two retaining members each comprising a rigid rotation-indexing portion adapted to fill one end of the N notches in the assembled state (this allows rotation-indexing surfaces which are part of the two flanges to engage the longitudinal edges of the same notch so that very good distribution of the torsional/shear forces between the two flanges is obtained);

each of the two retaining members has an elastically deformable tab which extends longitudinally from the rigid rotation-indexing portion to a free end forming a stop engaged with the anchoring part (which makes assembly of the filtering element particularly easy, and can increase the production rate).

the anchoring part comprises two retaining recesses each opening radially outward and placed respectively adjacent to two determined projections which define two of the engagement means, the free end of the tab having a lug projecting radially inward from an internal face of the tab and adapted to be received in a corresponding recess of the two retaining recesses. The recess may be in the form of an opening, which is advantageous for the circulation of gases (the pressure loss is limited if the sleeve and the surrounding anchoring part have numerous radial openings).

the two retaining members are diametrically opposed with respect to a central opening of the second flange, one or two rotation-indexing portions, distinct from the two retaining members, further being formed in the second flange. Thus, when the number N of notches is equal to four, the mechanical connection with the rotor element can be made more robust without further complicating the assembly between the two flanges (since the notches are typically non-deformable, the resistance of the mechanical connection is increased by increasing the contact surfaces engaged in the notches).

the sleeve comprises collar portions formed in a first annular region (which is preferably distanced from the pipe portion), the collar portions making it possible to locally raise the longitudinal edges, each of the two retaining members being received, in a position adjacent (in particular axially adjacent) to one of the N engagement means, in one of the N notches and extending laterally from one to the other of two adjacent collar portions in the assembled state. With this type of configuration, the mechanical connection is improved and the risk of wear to the plastic (particularly when the sleeve is of metal) is reduced.

the sleeve comprises an end projecting axially outward with respect to the first flange, and radial openings in a second intermediate annular region between the projecting end and a transverse wall, the radial openings forming part of the pipe portion.

the anchoring part comprises a pair of fingers extending longitudinally in the inner space from a tubular portion of the first flange surrounding the central opening, the fingers of the pair in question being spaced apart by a longitudinal slot proximal to the central opening, one of the two retaining members extending at least partially into the longitudinal slot and being clamped between two adjacent collar portions (this arrangement limits the possibilities for lateral displacement of the flexible portion of the retaining members).

the N engagement means are defined by N projections and the fingers of the pair are connected by a common termination, distal to the central opening, which defines one of the N projections (the spacing between the fingers allows forming radial openings for the passage of gas, without weakening the sleeve due to the common end which can be sandwiched between a retaining member and the bottom of a notch).

the sleeve is of metal and further comprises a portion for connecting to a drive shaft as well as a transverse wall extending between the pipe portion and the connecting portion, at least one axial orifice in the transverse wall allowing the passage of an elongate attachment member such as a screw (this enables simple installation of the filtering element arrangement in situ, at the end of a rotating shaft).

each of the N notches of the sleeve comprises a substantially flat bottom surface, N preferably being equal to four.

the sleeve is of metal and has a first annular sealing surface, preferably formed by a first bead, and a second annular sealing surface, preferably formed by a second bead, each of the first and second annular sealing surfaces being formed on said external face on either side of the N notches.

the second flange, molded of plastic, has a radial portion which covers the second axial face of the filtering medium and an inner skirt spaced apart from the radial portion to define an annular groove, wherein in the assembled state the first annular surface is in sealed radial contact against a tubular portion of the first flange (also molded of plastic), and the second annular surface is in sealed radial contact against an annular internal face of the inner skirt (these two metal-plastic sealing areas reducing the number of parts and thus facilitating assembly of the filtering element arrangement).

the N notches open axially near the second face in said assembled state, the rotor element comprising a shoulder which comes to abut axially against the first flange outside the inner space (with this arrangement, it is easy to mount the filtering element on the rotor element by inserting the sleeve from a first face side and to install the filtering element arrangement on a drive shaft of which the end is inserted from a second face side of the arrangement; furthermore, a simple collar of the drive shaft limits the insertion depth of the drive shaft while supporting the second flange).

Also provided is a device for purifying emissions issuing from a crankcase of an internal combustion engine, comprising the filtering element arrangement according to the invention, this device further comprising:

a rotational drive shaft which defines an axis of rotation and has an anchoring end for fixing the rotor element with the same alignment along the axis of rotation (which substantially coincides with the central axis of the filtering medium);

a housing which has an inlet to admit untreated gases, an outlet to evacuate treated gases, and a passage for the drive shaft aligned with the axis of rotation, the end of the drive shaft extending into the inner space being surrounded by a connecting portion of the rotor element; and two opposite abutment means formed respectively on the drive shaft and the rotor element, preferably outside the inner space, enabling the filtering element to be axially locked relative to the drive shaft when the rotor element is fixed to the anchoring end.

Another object of the invention is to provide a method for simple assembly of a filtering element arrangement, reducing the risks of breakage at the filtration insert.

To this end, a method for assembling a filtering element arrangement is provided, comprising the steps consisting essentially of:

fixing a first flange to a second flange in an inner space defined by an internal face of a ring-shaped coalescer filtering medium, by engaging at least one retaining member that is part of the second flange with an anchoring part of the first flange and enabling the first and second flanges to be rotationally integral, thus obtaining a filtering element;

inserting into the inner space a one-piece sleeve intended to rotate the filtering element, by inserting the sleeve through a central opening defined by the first flange;

rendering the sleeve and the filtering element rotationally integral by engaging, in N notches of an outer surface of the sleeve, N spaced-apart projections formed in the anchoring part of the first flange which project radially inward from an internal face of the filtering element, N being an integer greater than or equal to two, the engagement being achieved when the sleeve is inserted in a linear displacement, so that once inserted into the inner space, the sleeve is arranged in such a way that the N notches axially open in the direction of the second flange.

Advantageously, there are no need for complex interconnection parts and the mechanical connections can all be established in the inner space (leaving the external face of the filtering medium available), without significantly reducing the flow area for the gases. Contacts between the parts can be established at a distance from the pipe portion defined by the sleeve, which allows the axial flow area defined by the sleeve to be barely different from the flow area of the inner space (typically without reducing the passage diameter by two), and preferably larger or at least as large as the flow area at the end of the drive shaft.

BRIEF DESCRIPTION OF DRAWINGS

Other features and advantages of the invention will become apparent during the following description of several embodiments given by way of non-limiting examples, with reference to the accompanying drawings in which.

DESCRIPTION OF PREFERRED
EMBODIMENTS OF THE INVENTION

In the various figures, identical references indicate identical or similar elements.

Figure 1:
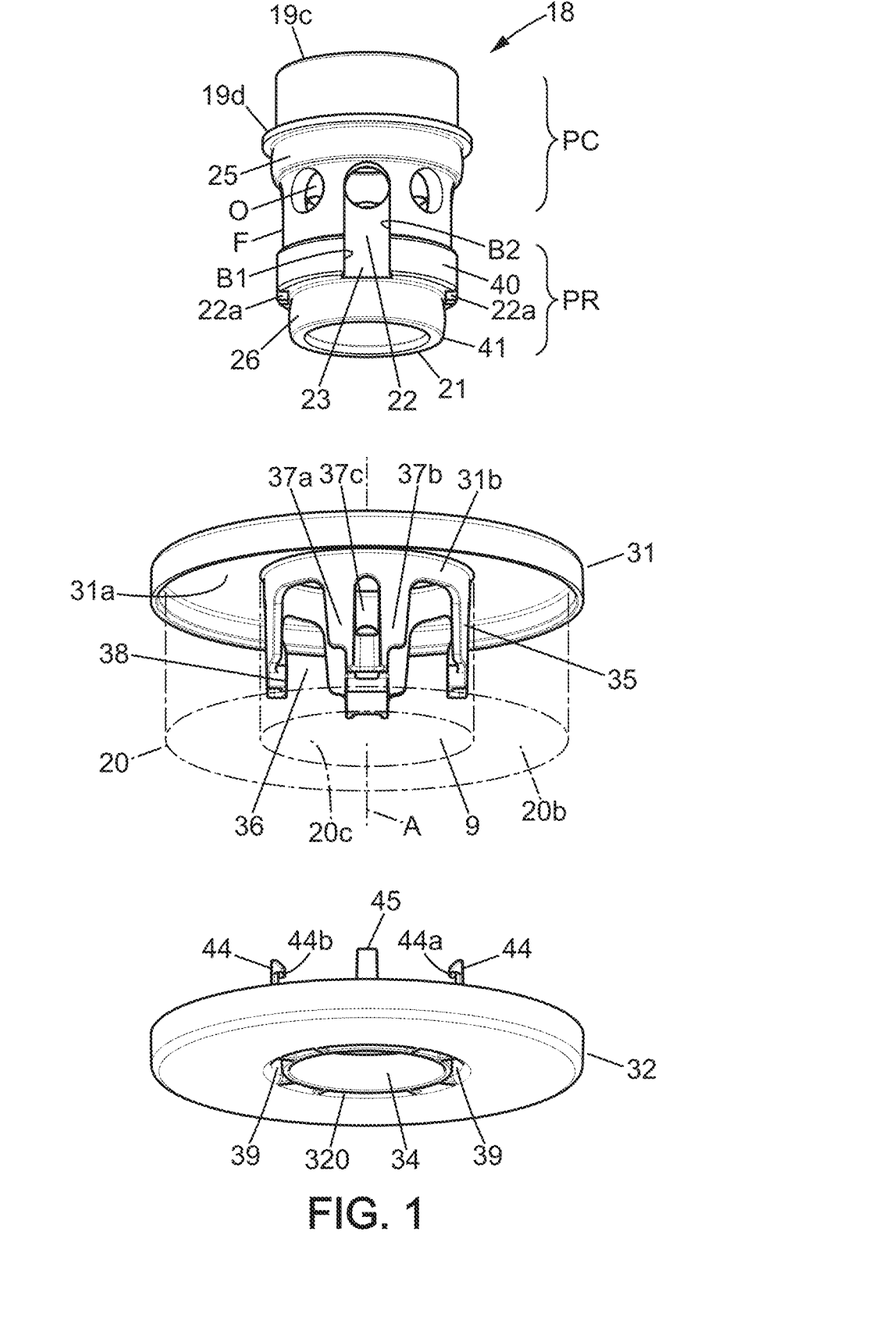
FIG. 1 is an exploded perspective view of a filtering element arrangement in a first embodiment according to the invention.
Figure 4:
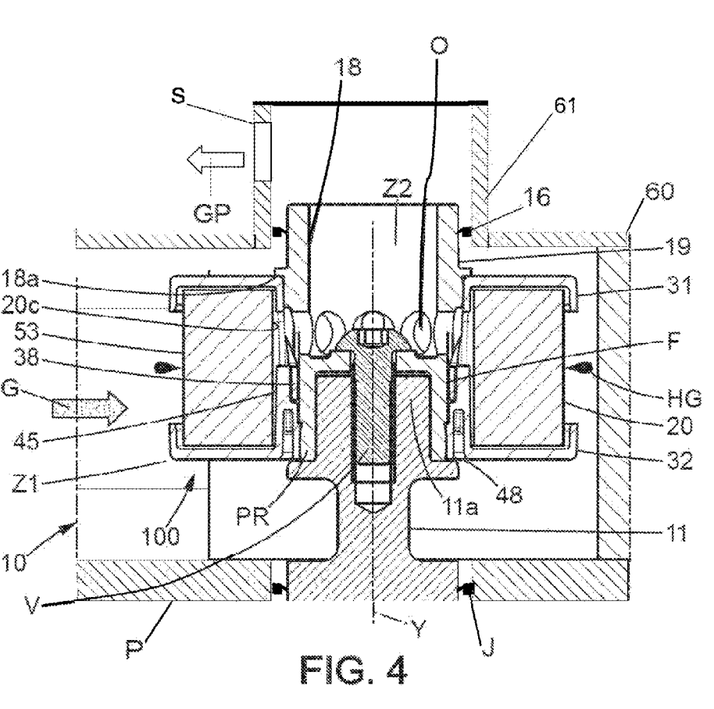
FIG. 4 is a vertical sectional view of a device for purifying crankcase emissions that integrates the filtering element arrangement in accordance with the first embodiment of the invention.
Figure 7:
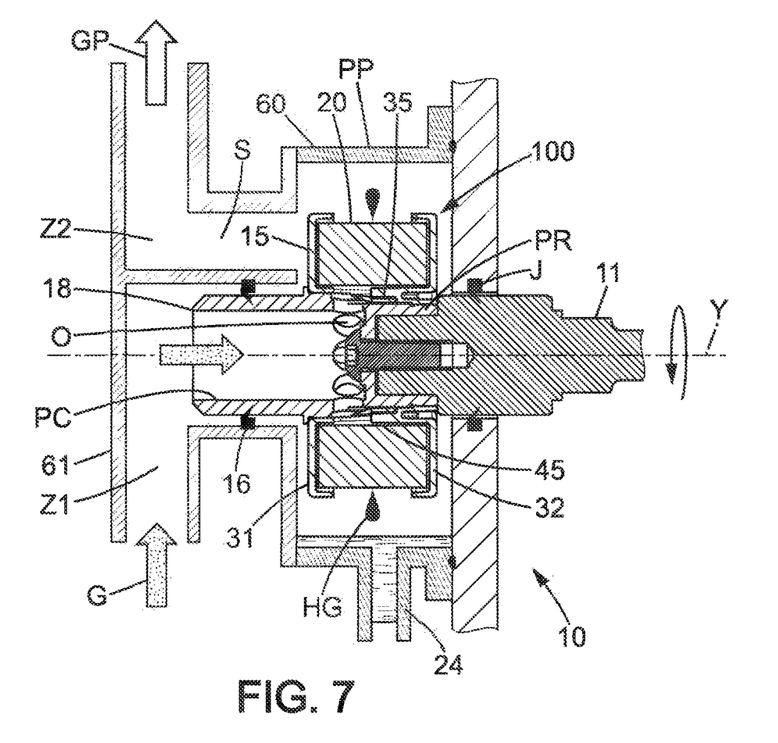
FIG. 7 is a schematic view in vertical section of a device for purifying crankcase emissions according to a variant embodiment of the invention.

With reference to FIGS. 1, 4, and 7, the separation device 10 makes it possible to separate the liquid (and possibly solid) portions of emissions issuing from the crankcase of an internal combustion engine and which come directly from the crankcase. The separation device 10 is typically part of an engine sub-assembly with a connecting line leading to the air intake.

As can be seen in each of FIGS. 4 and 7, the separation device 10 is mounted at the end 11a of a shaft 11 which is rotated directly or indirectly (pinion) by any rotational drive member of the crankcase, such as the crankshaft, camshaft, or chain tensioner. The rotation may also be obtained by one of the components associated with distribution, for example such as a pulley, the high-pressure diesel pump, the alternator, the air-conditioning compressor, or the water pump. The rotation may also be achieved by an electric motor (not shown) independent of the internal combustion engine or by a hydraulic motor linked to the oil pressure.

The filtering element 15 has a static separation capacity, thus operating even in the absence of rotation or analogous motion. This filtering element 15 consists here of a cartridge of filtering medium 20, typically having an ability to coalesce particles of oil. It is mounted on the shaft 11, preferably in a removable manner, by means of a rotor element 18.

The filtering medium 20 extends longitudinally about a central axis A between a first axial face 20a and a second axial face 20b. This filtering medium 20 is provided with a coalescing medium. The filtering medium has an internal face 20c (near the central axis A) which defines an inner space 9 in which gases can circulate. A first flange 31 covers the first axial face 20a, typically being adhered thereto, and a second flange 32 covers the second axial face 20a in a similar manner.

The flanges 31 and 32 may have the same diameter D which corresponds to the visible diameter of the filtering element arrangement 100. In a non-limiting manner, the preferred shape of the medium 20 is annular. Other shapes, in particular partially annular and/or symmetrical shapes with respect to the central axis A, may also be used. The shape must in all cases have at least one inlet surface proximal to the central axis A, defined by the internal face 20c, and at least one distal outlet surface.

The axis of rotation Y defined by the shaft 11 is typically a vertical axis in the case of FIG. 4 but may also be horizontal as in the case of FIG. 7; it is understood that it is possible to have a completely different orientation. The rotor element 18 comprises a sleeve 19, in this case a one-piece sleeve, which is intended to extend the shaft 11 in the longitudinal direction defined by the axis of rotation Y. The rotor element 18 may also optionally comprise sealing elements, assembled at one end of the sleeve and/or surrounding an external surface portion of the sleeve 19.

The sleeve 19 is rigid, preferably of metal or based on a non-flexible plastic or composite material, and comprises a portion PR for connecting to the drive shaft 11. This portion PR comprises a transverse wall 19a which forms, on the side opposite the shaft 11, the bottom of a pipe portion PC for circulating gases. The transverse wall 19a also forms the bottom of the connecting portion PR, on the side facing the shaft 11. The connecting portion PR here defines a housing L bounded by a tubular end portion 21. At least one axial orifice 19b is provided in the transverse wall 19a, for the passage of an elongate attachment member such as a screw V.

Although FIGS. 4 and 7 show the case of a screw V that can be removed from a threaded housing formed at the end 11a of the shaft 11, it is also possible to provide a rod threaded at the end 11a, which engages with a nut. The screw head or the nut extend into the hollow defined by the pipe portion PC, and the sleeve 19 can thus be kept integral with the shaft 11 (rotationally integral and with no possibility of axial displacement). Alternatively, another method for attachment between the sleeve 19 and the end 11a may be used, using fastening members that are known per se (where appropriate using radial tabs or lugs, for example with a bayonet connection, which makes it possible to eliminate the transverse wall 19a).

The end 11a fills the housing L and is in radial contact with the internal face of the tubular end portion 21. The sleeve 19 has an external face F provided with reliefs enabling a connection to the filtering element 15 which prevents it from rotating. These reliefs preferably extend at least on the exterior of the connecting portion PR. When the rotor element 18 engages in the inner space 9 against a plurality of contact surfaces SC, SC' by means of the reliefs of the external face F of the sleeve 19, the filtering element 15 can rotate without play relative to the rotor element 18. The connecting portion PR may also, possibly by itself, prevent the flow of gas towards the end 11a, for example by defining with the filtering element 15 an annular sealing area in the inner space 9.

The sleeve 19 may comprise, in its pipe portion PC, a projecting end 19c which projects axially outward with respect to the first flange 31 and radial openings O. Such radial openings O are positioned in an intermediate annular region which extends between the end 19c and the transverse wall 19. A wide opening for the gases is defined at the end 19c, so that the pipe portion PC is designed to cause gas to flow in the inner space 9 toward or away from the internal face 20c of the filtering medium 20. The end 19c communicates in this case with an inlet for untreated gases G or with an outlet for treated gases GP.

In the non-limiting example of FIGS. 1-2 and 3A-3B, the sleeve 19 has a first bead 25 forming a first annular sealing surface in radial annular contact with the first flange 31, near a central opening 33 defined by the first flange 31. Additionally or alternatively, the sleeve 19 may define an annular sealing surface with the second flange 32. Here, the sleeve 19 has a second bead 26 forming a second annular sealing surface in annular contact with the second flange 32, close to a central opening 34 defined by the second flange 32.

Figure 6:
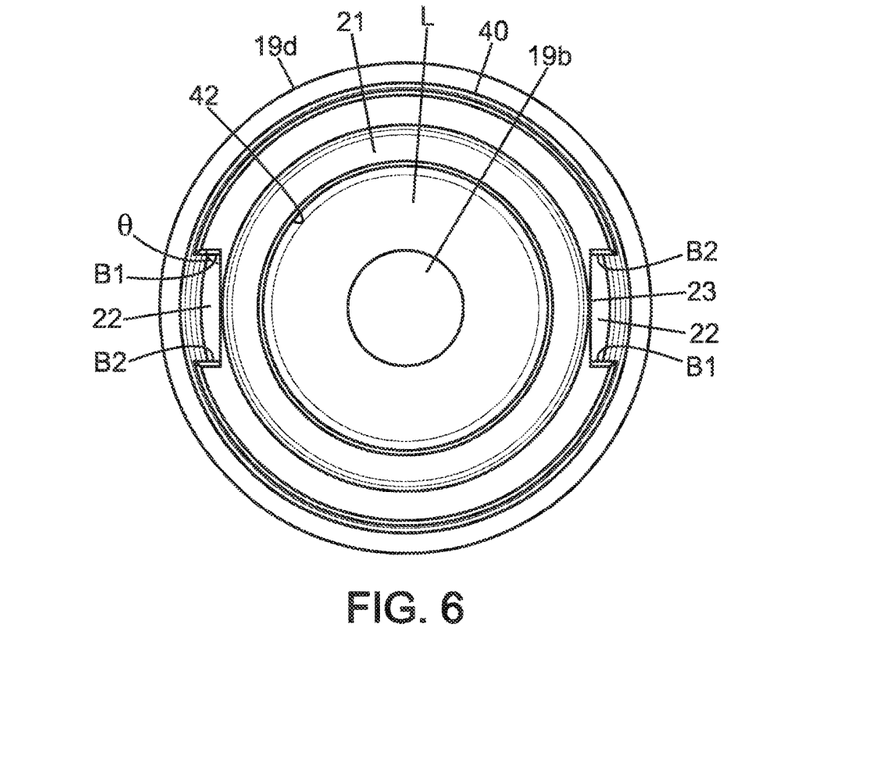
FIG. 6 is a bottom view of a sleeve used in the second embodiment of the invention and suitable for engaging with the first flange of FIG. 5.

Referring now to FIGS. 1, 3A-3B, and 6, it can be seen that the external face F has a number N of notches 22 (with N greater than or equal to two). Each of these notches 22 of the sleeve 19 has a bottom surface 23, which is preferably substantially planar. The notches 22 may each be defined between two longitudinal edges B1, B2, which here extend parallel to the central axis A (in an assembled state of the sleeve 19 with the filtering element 15). Although four notches 22 are provided in the example of FIGS. 1 and 3A-3B, a smaller number of notches, for example two, may be sufficient as illustrated in the cases of FIG. 6. A higher number N may also be suitable, preferably without exceeding eight notches 22. Of course, as a variant, the notches 22 may have edges B1, B2 which are not parallel or continuous; it is sufficient that these edges B1, B2 have a significant longitudinal component.

A U-shaped cross-section of the internal face of the notches 22, typically with two right angles, is a good compromise between the need for robustness of the sleeve 19 and the gripping effect between the contact surfaces SC and SC' (here angular) and the sleeve 19. Other shapes of surface with complementary profiles (for example a convex shape inserting into a complementary concave shape of the notch 22) are also suitable in alternative embodiments.

Figure 2:
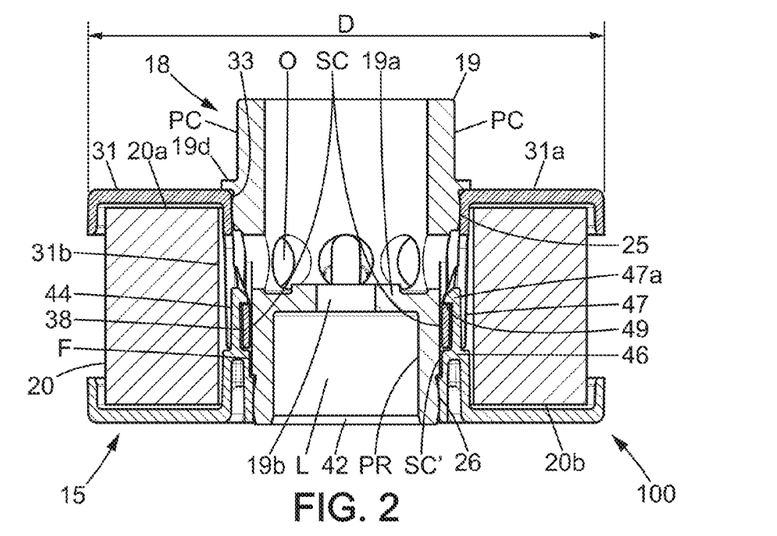
FIG. 2 is a sectional view of the filtering element arrangement of FIG. 1, in the inserted state of the rotational drive sleeve.

As can clearly be seen in FIGS. 1-2, the first and second annular sealing surfaces are formed on the external face F on either side of the notches 22, in order to avoid any interference with the mechanical connection area (with an anti-rotation effect).

The interconnection between the external face F of the sleeve 19 and at least one of the flanges 31, 32 will now be described with reference to FIGS. 1-2 and 3A-3B.

Apart from a radial portion 31a or 32a covering the respective axial faces 20a, 20b of the filtering medium 20, each of the flanges 31 and 32 has a portion extending into the inner space 9 for giving structure to the filtering element 15 (inter-flange connection) on the one hand and for ensuring a robust mechanical connection with the sleeve 19 on the other hand. To permit this mechanical connection, the filtering element 15 has a plurality of contact surfaces SC, SC' (with reliefs and typically distributed discontinuously around the central axis A) formed in the inner space 9.

Figures 3A, 3B:
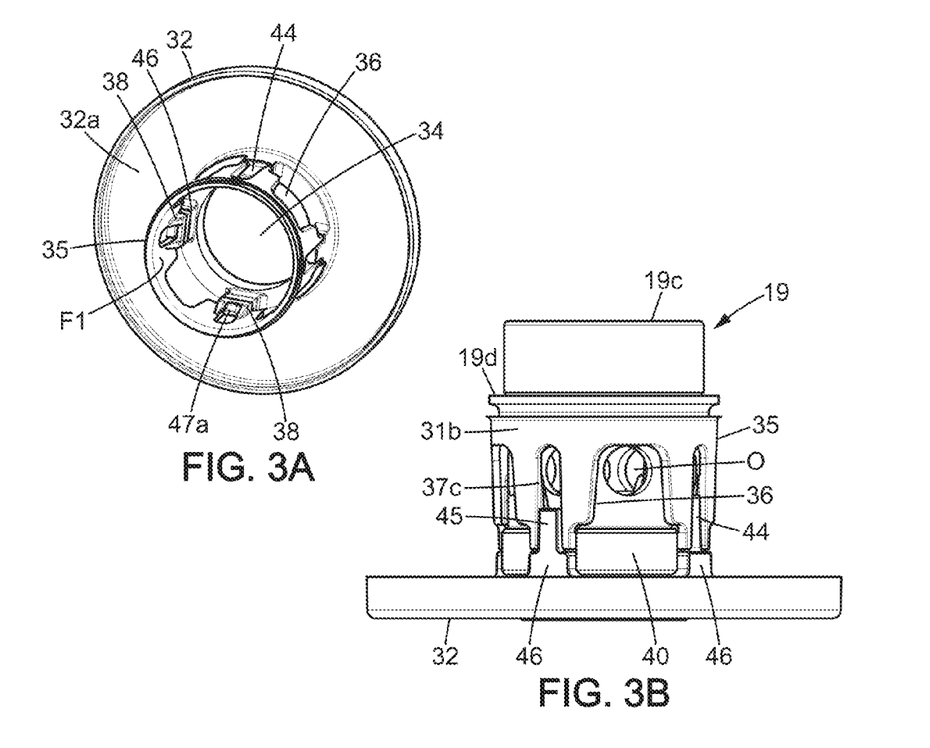
FIG. 3A is a perspective view illustrating the interconnection between the second flange and the anchoring part of the first flange of the filtering element, according to the first embodiment of the invention.
FIG. 3B is a side view illustrating the interconnection of FIG. 3A, but also showing the internally inserted rotor element.

With reference to FIGS. 1 and 3A-3B, the first flange 31 has first contact surfaces SC (among said plurality of contact surfaces) defined by an anchoring part 35 which extends longitudinally towards the second flange 32 from the radial portion 31a (which is here substantially planar) of the first flange 31. Indentations 36 are formed in the anchoring part 35 to allow the flow of gas in a radial direction. Between two adjacent indentations 36, a projection 38 projecting radially inward is formed on the internal face F1 of the anchoring part 35. The anchoring part 35 barely reduces the flow area defined by the radial portion 31a of the first flange 31 (at the opening 33 provided for insertion of the sleeve 19 into the inner space 9). The anchoring part can thus extend into the inner space 9 longitudinally around the sleeve 19 in an assembled state, from the radial portion 31a to an end region closer to the radial portion 32a of the second flange 32 and also contained in the inner space 9.

In some variants, the projections 38 are not positioned in the same circumferential region as the indentations 36.

A number N of projections 38 are provided here which is the same as the number of notches 22. Each projection 38 is configured to fit snugly into one of the notches 22, with the same circumferential spacing from one projection 38 to another as for the notches 22. In the example illustrated in FIGS. 1 and 3A, it is understood that the projections 38 extend laterally from one to the other of the longitudinal edges B1, B2. Alternatively, one or more slits or a similar recess may be provided which are defined in the projection 38 in an intermediate manner. In other words, a projection 38 which engages with a defined notch 22 can of course be composed of, in some variants, at least two projecting members of which one is engaged against a first of the longitudinal edges B1 and the other is engaged against a second of the longitudinal edges B2. In other words, the definition of the term "projection" is not restrictive and includes the case of separate members which are part of the same radially inwardly projecting engagement means.

As can clearly be seen in FIGS. 1 and 3B, according to one option the sleeve 19 may comprise collar portions 40 formed in an annular region (region locally enlarged), here distant from the pipe portion PC, optionally extended axially by a narrower tubular extension 41 on which the second bead 26 is formed. The tubular extension 41 defines the access opening 42 of the housing L. The collar portions 40 locally raise the longitudinal edges B1 and B2 with respect to the bottom surface 23, which renders more robust the mechanical link with anti-rotation effect.

The anchoring part 35 may comprise one or more pairs of fingers 37a, 37b which extend longitudinally into the inner space 9, in the assembled state, from a tubular portion 31b of the first flange 31 which surrounds the central opening 33. In each pair, the fingers 37a, 37b are spaced apart by a longitudinal slot 37c proximal to the central opening 33. The second flange 32 comprises one or more retaining members 44, engaging with the anchoring part 35. These retaining members 44, 45 which extend into the inner space 9 in the assembled state, in the direction of the central opening 33 of the first flange 31, can engage the longitudinal slots 37c or similar recesses which open axially towards the opening 34 of the second flange 32. The retaining member or members 44, 45 make it possible to render the first and second flanges 31, 32 integral in rotation, as can clearly be seen in FIGS. 3A-3B.

In the non-limiting example of FIGS. 1-2 and 3A-3B, four retaining members 44, 45 which here extend distanced from the pipe portion PC while surrounding the connection portion PR, define second contact surfaces SC' for the mechanical connection with the sleeve 19. More particularly, each of the retaining members 44, 45 may comprise a rigid rotation-indexing portion 46 adapted for filling one end 22a of the notches 22 in said assembled state. The rigid portion 46 typically has two sharp edges (in this instance by connecting adjacent faces at an angle θ of 90° with respect to one another; more generally and in a non-limiting manner, two surfaces connected at an angle θ of not more than 90 or 100° can define the angular contact surfaces SC and SC').

Thus, each of the retaining members 44, 45, here in a position adjacent to one of the projections 38 (or comparable engagement means), can be fitted into one of the notches 22. The retaining members 44, 45 extend laterally (at least at their rigid portion 46) from one to the other of two adjacent collar portions 40 in the state assembled with the sleeve (see FIG. 3B). Of course, the rigid portion 46 may, if necessary, be divided into multiple sub-portions and/or only engage against one of the longitudinal edges of the associated notch 22, in particular when the number N of notches is greater than or equal to four. Additionally or alternatively, the adjustment of a projection 38 in a notch 22 may be obtained by means of one of the retaining members 44, 45, for example by complementary shapes between the anchoring part 35 and the retaining members 44, 45, which makes it possible to fill a notch 22 by extending from one to the other of the longitudinal edges B1 and B2.

At least some of the retaining members 44 may further comprise a longitudinal extension in the form of an elastically deformable clipping tab 47. The elastically deformable tab 47 extends longitudinally from the rigid rotation-indexing portion 46 to a free end 47a (typically provided with a lug 44a) forming an abutment 44b engaged with a lip 49 of the anchoring part 35. During assembly of the two flanges 31 and 32, this tab 47 enables, by spreading radially outward, a temporary overlap between the free end 47a and a termination 37d which interconnects the fingers 37a, 37b of a pair of fingers 37a, 37b, on the side opposite the central opening 33 of the first flange 31. The two flanges 31 and 32 are snapped together when the tab 47 extends between the termination 37d and the tubular portion 31b and projects radially inward into the longitudinal slot 37c.

Although the figures illustrate slots 37c forming openings for the passage of gas in the example of the figures, with alignment between the radial openings O and the slots 37c and the indentations 36, it is more generally understood that retaining recesses (which open radially outward) can receive a lug 44a formed at the free end 47a of the tab 47.

When the sleeve 19 is inserted into the inner space 9 through the central opening 33, this sleeve 19 is linearly displaced within the central area defined by the anchoring part 35 (central area clearly visible in FIG. 3A). During this insertion, the notches 22 are engaged by the first and second contact surfaces SC and SC'. The N notches 22 open axially near the second face 20b (in other words toward the second flange 32 when the notches 22 have already been inserted into the inner space 9) in order to allow first the insertion of the projection 38, then, for at least a portion of the notches 22, of the rigid portion 46 of the retaining members 44. In other words, the rigid portion 46 comes to occupy the notch 22 after the projection 38 which is here defined in the termination 37d.

According to one non-limiting embodiment, the two retaining members 44 which have the elastically deformable tab 47 are typically diametrically opposite with respect to the central opening 34 of the second flange 32. Two other retaining members 45 formed in the second flange 32 may each substantially have a rigid rotation-indexing portion 46.

More generally, provision is made for one or more of the retaining members 44, 45 to engage an anti-rotation relief, for example defined by a longitudinal slot 37c, of the anchoring part 35 and optionally in one of the notches 22 defined in the outside face F of the sleeve 19. Alternatively, a slot with anti-rotation effect may be formed in the second flange 32.

It is also understood that the first and second contact surfaces SC and SC' used respectively in the first flange 31 and the second flange 32 may be reversed wholly or in part. Thus, in a variant of the example illustrated in FIGS. 1-4, while keeping in the second flange 32 the inner skirt 320 which is used for the sealed contact with the second bead 26 or similar sealing surface of the rotor element 18, it is possible to use projections 38 or similar engagement means in the second flange 32 and to form retaining members 44, 45 in the first flange 31.

Optionally, when an inner skirt 320 is provided in the second flange 32, it is spaced apart from the radial portion 32a in order to define an annular groove 39. Spacers may partition the annular groove 39 to limit radial deformations of the inner skirt around the opening 34. This stiffens the inner skirt 320, which can also serve as an axial stop for a shoulder 48 provided on the shaft 11.

With reference to FIGS. 4 and 7, one can see that two opposing abutment means, typically in the form of radially protruding reliefs to form a shoulder or at least one axial stop, may be formed respectively on the drive shaft 11 and the rotor element 18. These abutment means extend here outside the inner space 9, but this is a non-limiting option. Thus, in the assembled state as illustrated in FIG. 2, the rotor element 18 comprises a shoulder 18a, in this case integrally formed with the sleeve 19 (in a collar 19d), coming into axial abutment against the radial portion 31a of the first flange 31 outside the inner space 9.

This arrangement allows the filtering element 15 to be axially locked by the drive shaft 11 when the rotor element 18 is itself fixed to the anchoring end 11a. This is advantageous because it is then unnecessary to provide particularly robust tabs 47 for the inter-flange axial retention and/or the number of tabs 47 can be reduced (a single tab 47 being sufficient).

Figure 5:
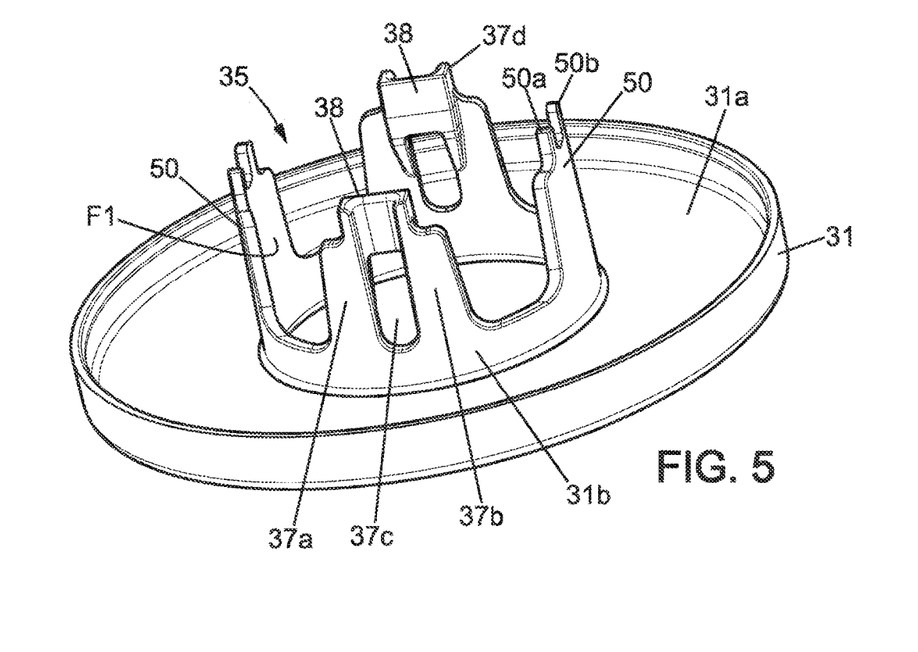
FIG. 5 is a perspective view illustrating the first flange with two projections suitable for sliding into the corresponding notches of the sleeve, in a second embodiment of the invention.

With reference to FIGS. 5 and 6, one can see that the number N of notches can be reduced to two. The anchoring part 35 remains substantially unchanged, except for the disappearance of two longitudinal slots 37c in comparison to the example of FIG. 3B, so as to form guide tabs 50 without projection 38. The forked end 50a, 50b of the guide tabs 50 enables form-fitting with a retaining member 45 engaging axially in the passage defined by the fork 50a, 50b.

In a variant with four grooves or notches 22 in the sleeve 19, the fork 50a, 50b forms a pair of lugs which protrude radially inwards relative to the internal face F1, and the space between these lugs is filled by the complementary end of a retaining member 45. The double anti-rotational effect between the flanges and between the filtering element and the sleeve 19 can then also be obtained (with a structure of the filtering element that can minimize the number of parts).

A first separation example will now be described with reference to FIG. 4.

In this case, centripetal filtration is provided, for which the filtering medium 20 comprises at least one external inlet surface 53, by which the untreated gases G arrive in the upstream region Z1, and at least one outlet surface defined by the internal face 20c, by which the treated gases GP emerge. The medium 20 extends between these two surfaces 53, 20c, with a thickness and a composition that are adapted to the desired efficiency and the acceptable pressure loss. The medium 20 is of the coalescer type with, for example, an arrangement of straight, curved, chevron, or coiled pleats.

The filtering element arrangement 100 extends into a filtration chamber of a housing 60 which comprises an inlet for the admission of untreated gases G and an outlet S for evacuating the treated gases GP. The housing 60 has a passage for the drive shaft 11 aligned with the axis of rotation Y, the end 11a of the drive shaft 11 extending into the inner space 9 while being surrounded by the connecting portion PR of the rotor element 18.

For a fluid to travel from the upstream region Z1 which communicates with the crankcase to the downstream region Z2, it is necessary to pass through the medium 20 of the filtering element 15. In the example of FIG. 4, a dynamic seal 16 in contact with the pipe portion PC forms an interface (with rotational fluidtightness) between the stator part and the rotor part, enabling the upstream region Z1 to be separated from the downstream region Z2. In the downstream region Z2, the treated gases GP circulate in the pipe portion PC and are redirected at least once towards an outlet S which communicates with the air intake. The outlet S here is defined in a removable part.

The outlet S may be defined by a pipe of a cover 61 forming part of the housing 60. The filtration cavity or chamber may be opened by removing the cover 61. The dynamic seal 16 may form part of this cover 61. At least one O-ring ensures, for example, the fluidtightness of the attachment between this cover 61 and the rest of the housing 60, in addition to the dynamic seal 16. Another dynamic seal J, placed opposite dynamic seal 16, surrounds the shaft 11 which passes through a wall P of the housing 60.

At the inlet to the filtering medium 20, drops of oil HG emerge that are sufficiently large in size to be affected by the centrifugal force related to rotation of the rotor part about axis Y (here coincident with the central axis A). Fibers of the medium 20 coalesce the oil microdroplets arriving on the upstream side Z1 by interception, sedimentation, inertial impact, or Brownian diffusion on the fibers, such that the oil particles must clump together to form larger drops HG.

The drops of oil HG separated from the gases are advantageously continuously released on the unpurified gases side. The drops of oil HG are evacuated in a simple manner by gravity, to a drainage pipe (not shown in FIG. 4).

The rotor part of the device 10 may comprise a drive connection with an electric motor having a programmable speed of rotation. The speed of rotation can thus be adjusted according to the relevant parameters.

The mode of separating oil from crankcase emissions described above by way of illustration is not limiting to the scope of the invention. Thus, a person skilled in the art can also implement and apply the invention to a device for purifying crankcase emissions which uses a reverse direction of flow, with the upstream region Z1 (in communication with the crankcase) defined by the inner space 9 of the filtering element 15 and the region adjacent to an inlet duct.

A second example of separation with a reverse direction of flow will now be described with reference to FIG. 7.

The axis of rotation Y may be horizontal, and the downstream region Z2 of treated gases GP which communicates with the outlet S may then be defined by the peripheral space around the filtering element 15. In this case, the filtration chamber may be provided with an upper region which is adjacent to the outlet duct S (laterally offset relative to the filtering element 15) and a lower oil recovery region.

Here, the crankcase gases G enter the upstream region Z1 by the cover 61, via the pipe portion PC. Rotational fluidtightness is ensured via the dynamic seal 16 between an inlet duct of the cover 61 and the end 19c of the sleeve 19 or similar cylindrical end of the rotor element 18. In the example shown, this seal 16 and at least part of the pipe portion PC make it possible to separate the inlet passage for the gas G in the upstream region Z1 from the discharge passage of the downstream region Z2. Opposite the outlet S, an additional dynamic seal J is provided between the rotational drive end 11a and a wall P of the stator part. This wall P is typically perpendicular to the axis Y of rotation.

It is understood that the untreated gases G will follow a path inside the medium 20 which moves away from the central axis A (here coincident with the axis of rotation y) and are therefore subjected to the centrifugal force inside this medium 12 when the separation element 100 is rotated. Due to the circulation of gas in the centrifugal direction, the oil drops HG can be pushed by the gas flow combined with the centrifugal force, towards the outer surface of the filtering medium 20.

From the outlet of this medium 20 are released the treated gases GP as well as drops of oil HG of a size large enough to be subjected to the centrifugal force from rotation of the rotor part about axis A. Due to this centrifugal effect, the larger drops of oil HG are radially expelled towards the peripheral wall PP of the housing 60. The treated gases GP are guided to a passage which diverges from the path of the drops of oil HG. The cross-section of the coalescer filtering medium 20 is large at the distal outlet surface (outer perimeter), such that the treated gases GP are slowed down and can therefore flow more easily without turbulence in the downstream region Z2. Guidance of the treated gases GP is enabled by the presence of guide walls. The drops of oil HG flow essentially due to gravity along the peripheral wall. The heavy phase formed by the drops of oil HG are effectively separated from the light phase formed by the treated gases GP, and it is understood that there is no re-entrainment of oil toward the outlet S.

As with the case of centripetal circulation of the crankcase gases, the drained oil can be returned to the crankcase in two ways. The oil can travel back down via a hose or any type of drain pipe 24 which leads to below the oil level, as illustrated in FIG. 7. Alternatively, the oil is stored in a buffer tank which empties at shutdown via a valve.

Furthermore, optional blades may be formed on the shaft 11 and/or on a flange 31 or 32 of the filtering element 15. Such aerodynamic elements for creating a suction effect may be placed, depending on the orientation of the blades and the direction of rotation of the shaft 11, either close to the outlet S or opposite the outlet S. The suction thus created reduces the loss of pressure in the filtering element 15 at very low rotational speeds and high gas flow rates. Such blades may be formed integrally with the second flange 32, for example by molding. It is thus possible to provide a removable filtering element arrangement 100 that is with or without blades 50.

One of the advantages of the filtering element arrangement 100 is to allow highly efficient separation of crankcase emissions while reducing the pressure drop associated with the presence of oil in comparison to a static coalescer, with no complexity in the design of the rotor part which may be removable. The simplification of the device increases its reliability.

Another advantage of a device according to the invention is that it can be placed outside the front engine cover so that it is no longer exposed to splashing and large volumes of oil. This results in fewer pressure drop spikes and better oil drainage.

It should be apparent to those skilled in the art that the present invention allows embodiments in many other specific forms without departing from the scope of the invention as claimed. Thus, the flanges 31 and 32 may be assembled together using any suitable attachment method, snap fitting being a preferred (but not limiting) option for a particularly simple assembly of the filtering element 15.

The invention claimed is:

1. A filtering element arrangement for a device for purifying emissions from a crankcase of an internal combustion engine, the arrangement comprising:
    a filtering element which has an annular filtering medium that extends longitudinally around a central axis between a first axial face and a second axial face, the filtering medium having an internal face defining an inner space;
    a rotor element configured for rotating the filtering element, engaged in the inner space against a plurality of contact surfaces of the filtering element in an assembled state between the rotor element and the filtering element;
    wherein the rotor element has a one-piece sleeve which extends longitudinally around the central axis in the assembled state and has an external face on which are formed N notches each defined between two longitudinal edges, the sleeve being suitable for insertion into the inner space;
    and wherein the filtering element comprises a first flange covering the first axial face, the first flange comprising an anchoring part which extends longitudinally into the inner space around the sleeve, towards a second flange of the filtering element, first contact surfaces among said plurality of contact surfaces being spaced apart and formed by the anchoring part that provides N engagement means projecting radially inwardly for engaging the N notches in a fitted manner, N being an integer greater than or equal to two, the second flange comprising at least one retaining member engaged with the anchoring part and making it possible to render the first flange and the second flange integral in rotation.

2. The arrangement according to claim 1, wherein the first flange provides a first central opening enabling insertion of the sleeve into the inner space, the second flange comprising two spaced-apart retaining members engaged with the anchoring part and rendering the first flange and the second flange rotationally integral.

3. The arrangement according to claim 2, wherein the sleeve comprises a pipe portion designed to circulate a flow of gas in the inner space towards or away from the internal face of the filtering medium, the pipe portion projecting axially outward from the first flange, the two retaining members in the assembled state extending distanced from the pipe portion and defining second contact surfaces among said plurality of contact surfaces.

4. The arrangement according to claim 2, wherein the two retaining members are respectively in contact with the anchoring part in two respective overlapping areas between the first flange and the second flange, the two retaining members each comprising:
    a rigid rotation-indexing portion adapted to fill one end of the N notches in said assembled state; and
    an elastically deformable tab which extends longitudinally from the rigid rotation-indexing portion to a free end forming a stop engaged with the anchoring part.

5. The arrangement according to claim 4, wherein the anchoring part comprises two retaining recesses each opening radially outward and placed respectively adjacent to two determined projections which define two of the engagement means, the free end of the tab having a lug projecting radially inward from an internal face of the tab and adapted to be received in a corresponding recess of the two retaining recesses.

6. The arrangement according to claim 2, wherein the two retaining members are diametrically opposed with respect to a central opening of the second flange, one or two rotation-indexing portions, distinct from the two retaining members, further being formed in the second flange.

7. The arrangement according to claim 2, wherein the sleeve comprises collar portions formed in a first annular region, the collar portions making it possible to locally raise the longitudinal edges, each of the two retaining members being received, in a position adjacent to one of the N engagement means, in one of the N notches and extending laterally from one to the other of two adjacent collar portions in said assembled state.

8. The arrangement according to claim 7, wherein the sleeve comprises:
   an end projecting axially outward with respect to the first flange; and
   radial openings in a second intermediate annular region between the projecting end and a transverse wall, the radial openings forming part of a pipe portion designed to circulate a flow of gas in the inner space towards or away from the internal face of the filtering medium.

9. The arrangement according to claim 7, wherein the anchoring part comprises a pair of fingers extending longitudinally in the inner space from a tubular portion of the first flange surrounding the central opening, the fingers of said pair being spaced apart by a longitudinal slot proximal to the central opening, one of the two retaining members extending at least partially into the longitudinal slot and being clamped between two adjacent collar portions.

10. The arrangement according to claim 9, wherein the N engagement means are formed by N projections, the fingers of said pair being connected by a common termination, distal to the central opening, which defines one of the N projections.

11. The arrangement according to claim 1, wherein the sleeve is of metal and further comprises:
   a portion for connecting to a drive shaft;
   a transverse wall extending between a pipe portion for circulating gases and the connecting portion; and
   at least one axial orifice in the transverse wall, forming a passage for a screw.

12. The arrangement according to claim 1, wherein each of the N notches of the sleeve comprises a flat bottom surface.

13. The arrangement according to claim 1, wherein the sleeve is of metal and has a first annular sealing surface formed by a first bead and a second annular sealing surface formed by a second bead, each of the first annular sealing surface and the second annular sealing surfaces being formed on the external face.

14. The arrangement according to claim 13, wherein the second flange has a radial portion which covers the second axial face of the filtering medium and an inner skirt spaced apart from the radial portion to define an annular groove, and wherein, in the assembled state:
   the first annular surface is in sealed radial contact against a tubular portion of the first flange; and
   the second annular surface is in sealed radial contact against an annular face of the inner skirt.

15. The arrangement according to claim 1, wherein the N notches open axially near the second face in the assembled state, the rotor element comprising a shoulder which comes to abut axially against the first flange outside the inner space.

16. A device for purifying a gas issuing from a crankcase of an internal combustion engine, comprising a filtering element arrangement that comprises:
   a filtering element which has an annular filtering medium that extends longitudinally around a central axis between a first axial face and a second axial face, the filtering medium having an internal face defining an inner space;
   a rotor element configured for rotating the filtering element, engaged in the inner space against a plurality of contact surfaces of the filtering element in an assembled state between the rotor element and the filtering element, the rotor element having a one-piece sleeve which extends longitudinally around the central axis in the assembled state and has an external face on which are formed N notches each defined between two longitudinal edges, the sleeve being suitable for insertion into the inner space;
   wherein the filtering element comprises a first flange covering the first axial face, the first flange comprising an anchoring part which extends longitudinally into the inner space around the sleeve, towards a second flange of the filtering element, first contact surfaces among said plurality of contact surfaces being spaced apart and formed by the anchoring part that provides N engagement means projecting radially inwardly for engaging the N notches in a fitted manner, N being an integer greater than or equal to two, the second flange comprising at least one retaining member engaged with the anchoring part and making it possible to render the first flange and the second flange integral in rotation
   and wherein the device further comprises:
   a rotational drive shaft which defines an axis of rotation and has an anchoring end for fixing the rotor element with the same alignment along the axis of rotation which coincides with the central axis of the filtering medium;
   a housing which has an inlet to admit untreated gases, an outlet to evacuate treated gases, and a passage for the drive shaft aligned with the axis of rotation, the anchoring end extending into the inner space being surrounded by a connecting portion of the rotor element; and
   two opposite abutment means formed respectively on the drive shaft and the rotor element, enabling the filtering element to be locked axially relative to the drive shaft when the rotor element is fixed to the anchoring end.

17. A method for assembling a filtering element arrangement according to claim 1, comprising the steps consisting essentially of:
   fixing a first flange to a second flange in an inner space defined by an internal face of a ring-shaped coalescer filtering medium, by engaging at least one retaining member that is part of the second flange with an anchoring part that is part of the first flange and enabling the first flange and the second flange to be rotationally integral, thus obtaining a filtering element;
   inserting into the inner space a one-piece sleeve configured to rotate the filtering element, by inserting the sleeve through a central opening defined by the first flange;
   rendering the sleeve and the filtering element rotationally integral by engaging, in N notches of an external surface of the sleeve, N spaced-apart projections formed in the anchoring part which project radially inward from an internal face of the filtering element, N being an integer greater than or equal to two, the engagement being achieved when the sleeve is inserted in a linear displacement, so that once inserted into the inner space, the sleeve is arranged in such a way that the N notches axially open in the direction of the second flange.

18. The arrangement according to claim 3, wherein the sleeve comprises collar portions formed in a first annular region, the collar portions making it possible to locally raise the longitudinal edges, each of the two retaining members being received, in a position adjacent to one of the N engagement means, in one of the N notches and extending laterally from one to the other of two adjacent collar portions in said assembled state.

19. The arrangement according to claim 4, wherein the sleeve comprises collar portions formed in a first annular region, the collar portions making it possible to locally raise the longitudinal edges, each of the two retaining members being received, in a position adjacent to one of the N engagement means, in one of the N notches and extending laterally from one to the other of two adjacent collar portions in said assembled state.

20. The arrangement according to claim 5, wherein the sleeve comprises collar portions formed in a first annular region, the collar portions making it possible to locally raise the longitudinal edges, each of the two retaining members being received, in a position adjacent to one of the N engagement means, in one of the N notches and extending laterally from one to the other of two adjacent collar portions in said assembled state.

* * * * *